Jan. 21, 1936. L. H. MESSINGER, JR., ET AL Re. 19,828

ATTACHMENT FOR INTERNAL COMBUSTION ENGINES

Original Filed March 15, 1927. 3 Sheets-Sheet 1

LESTER H. MESSINGER JR.
& A. LAWRENCE RIKER ASSIGNEE
OF ANDREW L. RIKER DECEASED.
INVENTORS.

BY John A. Hanahan
ATTORNEY

Jan. 21, 1936. L. H. MESSINGER, JR., ET AL Re. 19,828

ATTACHMENT FOR INTERNAL COMBUSTION ENGINES

Original Filed March 15, 1927 3 Sheets-Sheet 2

LESTER H. MESSINGER JR.&
A. LAWRENCE RIKER ASSIGNEE
OF ANDREW L. RIKER DECEASED.
INVENTORS.

BY John A. Hanna Jr.
ATTORNEY

ATTACHMENT FOR INTERNAL COMBUSTION ENGINES

Original Filed March 15, 1927 3 Sheets-Sheet 3

LESTER H. MESSINGER JR. &
A. LAWRENCE RIKER ASSIGNEE
OF ANDREW L. RIKER DECEASED.
INVENTORS

BY John A. Hanrahan
ATTORNEY

Reissued Jan. 21, 1936 Re. 19,828

UNITED STATES PATENT OFFICE 19,828

ATTACHMENT FOR INTERNAL COMBUSTION ENGINES

Lester H. Messinger, Jr., Trumbull, Conn., and Andrew L. Riker, deceased, late of Fairfield, Conn., by A. Lawrence Riker, assignee, Fairfield, Conn.; said Messinger assignor to Messinger Devices, Incorporated, a corporation of Connecticut Original No. 1,890,791, dated December 13, 1932, Serial No. 175,484, March 15, 1927. Application for reissue April 3, 1934, Serial No. 718,850

27 Claims. (Cl. 123—97)

This invention relates to an attachment for internal combustion engines, and has more particular reference to an attachment for the engines of automotive vehicles. The attachment has been designed mainly for the purposes of minimizing crank-case dilution, of saving gasoline, and of preventing the drawing of lubricating oil into combustion chambers.

The invention presents features and characteristics of construction adapted to accomplish the main and specific objects accomplished by employment of the construction described, illustrated and claimed in the pending application for Letters Patent of Lester H. Messinger, Serial No. 102,347, filed April 15, 1926, in a manner different from and in certain regards an improvement over the disclosure of said application.

The broad object of the present invention is to provide in an internal combustion engine for an automotive vehicle, a means for keeping a cylinder or cylinders free of gasoline mixture at all times when the conditions are not favorable to ignition.

A more specific object is to provide an automotive vehicle internal combustion engine including means for cutting off the supply of fuel to the engine cylinders when an automotive vehicle is propelling the engine or when the engine is racing with a retarded throttle.

With the above objects in view, as well as others which will appear as the specification proceeds, the invention comprises the construction, arrangement, and combination of parts as now to be fully described and as hereinafter to be specifically claimed, it being understood that the disclosure herein is merely illustrative and meant in no way in a limiting sense, changes in details of construction and arrangement of parts being permissible so long as within the spirit of the invention and the scope of the appended claims.

Figure 1:
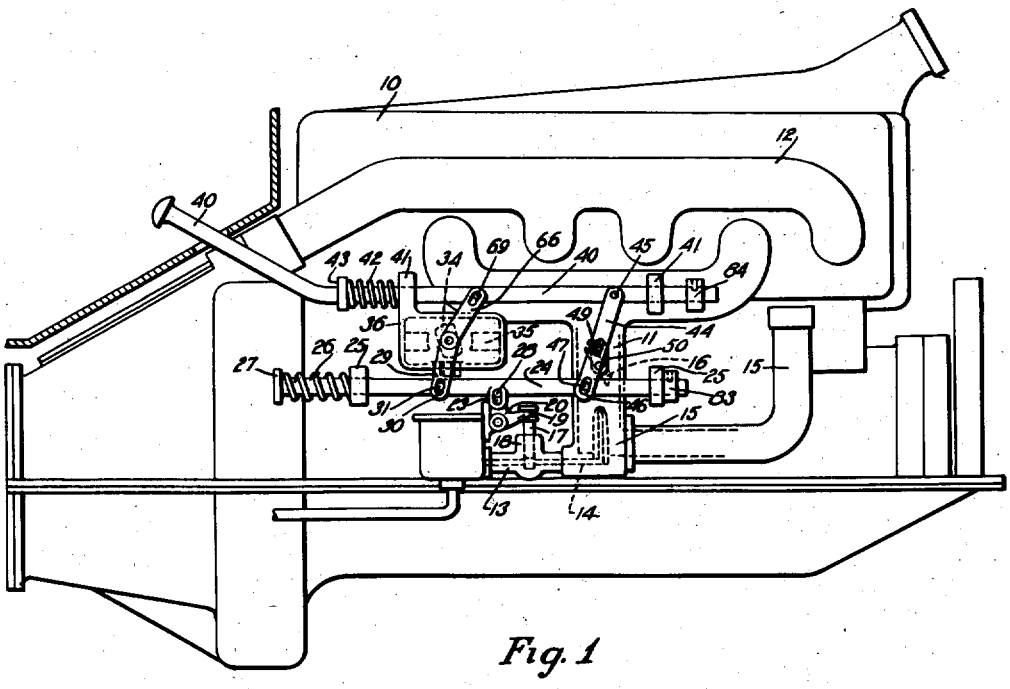
Fig. 1 is a side elevational view disclosing the improvement as applied to an automotive vehicle, the throttle actuating means being shown advanced and the fuel supply line open.

The improvement includes a special device adapted to be automatically actuated when the throttle actuating means is retarded to close the fuel supply control valve and to move the ordinary throttle valve to wide open position and to maintain said fuel supply valve closed and said throttle valve open so long as propulsion of the engine is by a force other than explosions in the engine cylinders. As disclosed, this special device is an electromagnet, although a special device of different construction could be utilized. Actuation of the special device to manipulate the fuel supply control valve to closed position and the throttle valve to wide open position when the throttle actuating means is retarded can be obtained in any one of several different manners. For example, actuation of the special device may be directly by the engine speed with throttle actuating means retarded, as when the engine speed energizes the magnet to an extent sufficient to overcome the action of the control (the spring) tending to hold the fuel supply valve in open position and the throttle adjusting devices in inoperative position. Or actuation of the special device may be directly by vehicle speed (with throttle actuating means retarded), as when the vehicle speed similarly energizes the magnet. Or actuation of the special device may be obtained at all times (with throttle actuating means retarded) when the engine is in gear with the driven wheels or axle of an automotive vehicle.

With respect to the drawings, 10 represents the cylinders of an internal combustion engine of a character ordinarily applied to automotive vehicle use, 11 the intake manifold, 12 the exhaust manifold, 13 the carburetor including the fuel intake or supply line 14 and the air inlet 15, and 16 the throttle valve in the intake manifold adjacent the carburetor, between the cylinders and the fuel intake line and air inlet of the carburetor.

A fuel supply control valve 17 slidably arranged in a boss 18 of the fuel supply line is conveniently pivotally attached, as at 19, to one end of a bell crank lever 20 pivoted upon the engine as at 21 and having a stud 28 upon its end opposite the valve 17 conveniently pivotally associated with an elongated slot 22 of an enlargement 23 of a manipulating rod 24 slidable in bearings 25 supported upon the engine in any ordinary way. 26 is a coil spring upon an end portion of said manipulating rod 24 and between a bearing 25 and a head 27 upon the adjacent end of the rod, the coil spring normally holding the manipulating rod rearwardly of the engine. 83 is a collar upon the manipulating rod 24 adapted to engage a bearing 25 to limit rearward movement of said manipulating rod.

Figure 7:
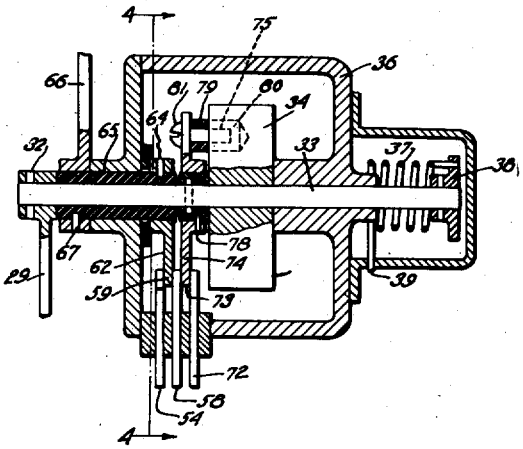
Fig. 7 is a sectional view of the special device as on line 7—7 in Fig. 4.

A lever 29 having at one of its end portions an elongated slot 30 with which a stud 31 upon the manipulating rod 24 is conveniently pivotally associated, has its end spaced from said rod fixed, as at 32, upon a shaft 33 rigidly carrying an armature 34 of a magnet 35 in a housing 36 of ordinary or preferred structure. A coil spring 37 upon said shaft 33 has one of its ends made fast to the shaft, as at 38, and its other end secured to a part of the housing, as at 39. See Fig. 7. The coil spring 37 acts in the same direction as the coil spring 26, to normally hold the lever 29 swung to its farthest rearward position.

Numeral 40 represents a throttle actuating rod slidable in brackets 41 upon the engine, and 42 denotes a coil spring upon said rod, between a bracket 41 and a collar 43, normally holding said throttle actuating rod in its retarded position (the location which would ordinarily place the throttle of the carburetor in idling position). An equalizing bar 44 pivoted at one end, as at 45, to the throttle actuating rod, is provided at its other end with an elongated slot 46 conveniently pivotally associated with a stud 47 upon the manipulating rod 24. The equalizing bar is also provided at about its mid-length with an elongated slot 48 conveniently pivotally associated with a stud 49 upon a lever 50 fixed to the shaft 51 of the throttle valve 16, said shaft 51 being mounted in the walls of the intake manifold. See Figs. 1, 2 and 3. 84 is a collar upon the throttle actuating rod 40 adapted to engage a bracket 41 to limit rearward movement of said throttle actuating rod.

Figure 2:
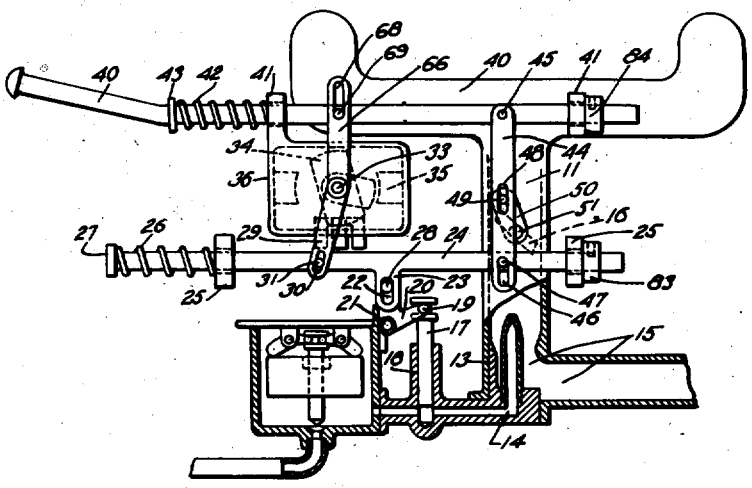
Fig. 2 is a view corresponding with the disclosure of Fig. 1, parts being omitted, showing the throttle actuating means retarded and the fuel the air inlet open.

It is the service of the coil springs 26 and 37 to hold the manipulating bar 24 toward the left in Fig. 2 of the drawings to keep the fuel supply control valve 17 in the open position of the fuel supply line 14, and also to keep the equalizing bar 44 situated toward the left to locate the lever 50 in the idling (nearly closed) position of the throttle 16, provided the throttle actuating rod is in retarded position as in said Fig. 2.

It is the service of the magnet, when energized to a sufficient extent, to act upon the armature 34 to rotate the shaft 33 and swing the lever 29 to advance the manipulating rod 24 to the closed position of the valve 17, and also to swing the lower portion (see Fig. 3) of the equalizing bar 44 forwardly to position the throttle approximately wide open, against the action of the coil springs 26 and 37 whereby to provide for a free flow of air to the engine cylinders to the exclusion of explosive mixture. But one of these coil springs 26 and 37 is required, although both may be employed to advantage.

The magnet 35 can be energized only when the throttle actuating rod is retarded, and said magnet is adapted to have sufficient power to actuate the armature 34 against the action of the coil springs 26 and 37, or against either of said coil springs when one is employed, only when a throttled down engine is being driven by a force other than explosions in its cylinders, as when a vehicle is driving a throttled down engine, or a throttled down engine is racing.

Figure 8:
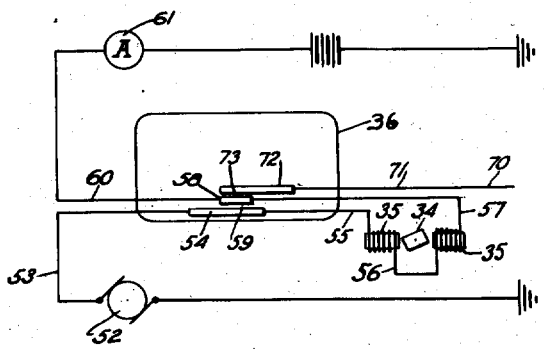
Fig. 8 is a diagrammatic view disclosing a wiring system to be utilized in connection with the improvement.

Referring more particularly to Fig. 8, I have there disclosed a wiring system to be utilized in connection with the improvement. In said figure, 52 is a generator, 53 is a lead wire from said generator to a contact 54, 55 is a lead wire from said contact 54 to the magnet 35, 56 is a wire connecting the poles of said magnet, 57 is a lead wire from the magnet to a second contact 58, the contacts 54 and 58 together comprising the fixed contacts of a switch 59 in said housing 36, and 60 is a lead wire from said second contact 58 to the ammeter 61. Clearly, with the contacts 54 and 58 unconnected, a current will flow through the magnet, via the leads described, from generator to ammeter, to energize the magnet, but by electrically connecting the fixed contacts 54 and 58, the circuit will be shunted, and the magnet will lose its energy.

Referring to Figs. 1 to 7, the switch 59 consists of the fixed contacts 54 and 58 spaced apart a distance to allow a pivoted contact 62 to wipe between said fixed contacts. Said fixed contacts are suitably supported upon the housing, or the engine, in any convenient manner to be insulated from each other and from said housing, or engine, the contact 58 desirably being a rectangular bar, and the contact 54 being a rectangular bar having an extension or spring arm 63 arranged parallel to the contact 58 and providing the desired resiliency for the fixed contact members of the switch 59. The pivoted contact 62 is a lever or arm fixed, as at 64, upon a shaft 65 mounted in the housing 36 about the shaft 33. Numeral 66 represents a lever having one of its ends fixed upon said shaft 65, as at 67, and its other end provided with an elongated slot 68 conveniently pivotally receiving a stud 69 upon the throttle actuating rod 40. The pivoted contact 62 is properly insulated from the shaft 65 in any convenient manner. As disclosed, said shaft 65 is of insulating material.

Figure 3:
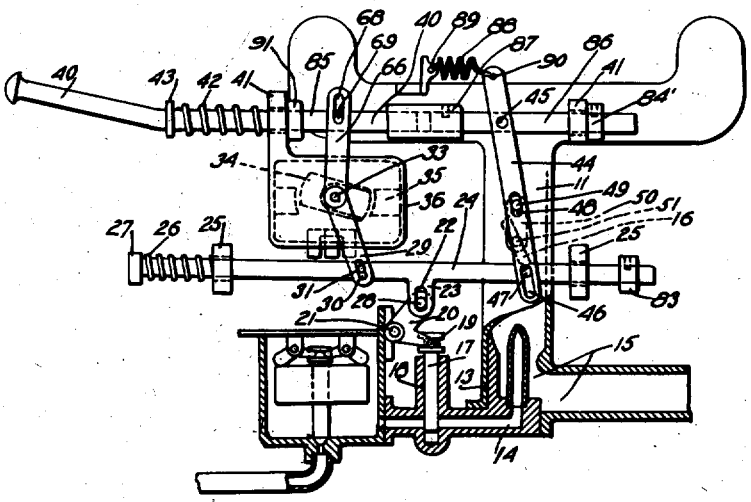
Fig. 3 is a view corresponding with the disclosure of Fig. 2, showing the throttle actuating means retarded, the fuel supply line closed, and the air inlet open.
Figure 6:
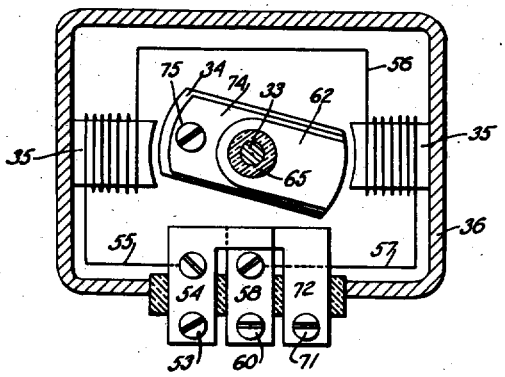
Fig. 6 is a view corresponding with the disclosure of Figs. 4 and 5, the parts of the special device being positioned as in Fig. 3.
Figure 5:
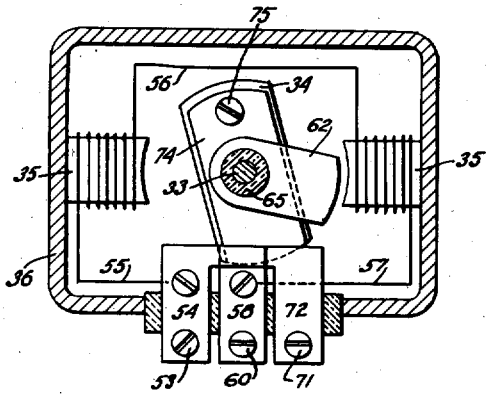
Fig. 5 is a view corresponding with the disclosure of Fig. 4, the parts of the special device being positioned as in Fig. 2.
Figure 4:
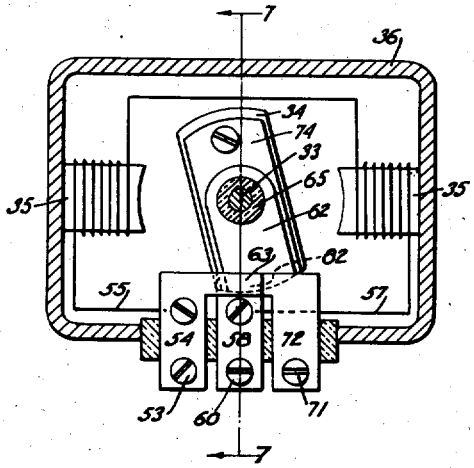
Fig. 4 is an enlarged sectional view, as on line 4—4 in Fig. 7, detailing a special device adapted to be automatically actuated to control the fuel supply line and the air inlet, the parts of the special device being positioned as in Fig. 1.

It will be clear that the magnet 35 will be in the circuit having the generator and the ammeter at all times when the throttle actuating rod is retarded as in Figs. 2 and 3 to cause the pivoted contact 62 to be out of engagement with the fixed contacts 54 and 58 and the switch 59 to thus be open, and that when the throttle actuating rod is so retarded, the fuel supply inlet will be closed and the throttle valve will be wide open provided the magnet is energized to an extent sufficient to overcome the action of the coil spring 26, or the coil spring 37, or both of said coil springs in the construction as disclosed.

Clearly said magnet can have sufficient power to overcome said coil springs under any desired and predetermined condition. For example, the magnet can be stronger than the coil springs so long as the engine speed is at or above a predetermined speed, and said coil springs can act when the engine speed is below said predetermined speed. This certain speed would ordinarily be that speed just above the speed at which the engine would normally operate with throttle actuating rod retarded, so that when this speed of engine is reached and said throttle actuating rod is retarded, as when a vehicle is driving the engine, or the engine is racing, the fuel line is closed and the throttle valve is wide open, but at all other times the fuel line is open and the throttle valve is positioned as in an ordinary engine now of commerce. Or the magnet can overcome the coil springs when the vehicle speed has reached a certain speed. Or the magnet can overcome the coil springs at all times when there is connection between an engine and vehicle. However, it is preferable that the magnet be related to the engine speed, because when the engine speed is the factor utilized, all of the circumstances of engine use when it is desired to feed air to cylinders instead of gas mixture can be met, as has hereinbefore been fully set forth.

It has already been stated that the throttle valve is held in idling (almost closed) position by the equalizing bar 44 when the coil springs 26 and 37 are holding the manipulating rod 24 in rearward position and the throttle actuating rod is retarded. As the throttle actuating rod is advanced, the upper portion of the equalizing bar 44 is swung forwardly, as in Fig. 1, to open said throttle valve a distance corresponding to the amount to which said throttle actuating rod is advanced. Upon the initial movement forwardly of said throttle actuating rod the current is shunted from the magnet to insure that the coil springs will stably hold the lower end of the equalizing bar rearwardly, so that during all conditions of partially advanced or totally advanced throttle actuating rod, the throttle 16 will function in precisely the manner as is now usual with ordinary explosive engines of commerce.

In view of the fact that the pivoted contact 62 is connected with the throttle actuating rod to be brought into positive engagement with the fixed contacts 54 and 58 as said throttle actuating rod is advanced, the circuit is shunted away from the magnet and the fuel inlet opens and the throttle adjusting devices become inoperative simultaneously with the advancement of said throttle actuating rod to insure a feed of explosive mixture at the commencement of the advancement of said throttle actuating rod.

It may be desirable that when the throttle actuating rod is advanced from retarded position, the pivoted contact 62 be brought into engagement with the fixed contacts 54 and 58 to shunt the circuit away from the magnet before the equalizing bar 44 is manipulated, to thus insure a feed of gaseous fuel at the commencement of opening of the throttle valve. In Fig. 3 we have disclosed a modified construction for this purpose. As disclosed in said Fig. 3, the throttle actuating rod 40 is in two spaced apart pieces, denoted 85 and 86, arranged in a sleeve 87 fixed to the pieces 86. A coil spring 88 fixed to the engine as at 89 and to an extension of the equalizing bar 44 as at 90, holds the piece 86 in rearward position, while a collar 84' limits the rearward movement of said piece 86. The coil spring 42 holds the piece 85 in rearward position, while a collar 91 limits rearward movement of said piece 85. Clearly initial advancement of the piece 85 will cause the pivoted contact 62 to engage the fixed contacts 54 and 58, and further advancement will cause the piece 85 to engage the piece 86 to advance said piece 86, together with the equalizing bar.

It is preferable that the ignition circuit be open at all times when the fuel supply line is closed and the air inlet is wide open. In Fig. 8 the ignition circuit is designated 70. It includes a lead 71, as from the ordinary ignition switch on the dash of an automotive vehicle, to a third contact 72 in the housing 36 adjacent and spaced from the contact 58, and also includes said contact 58, and the lead 60 to the ammeter 61. As clearly disclosed in Figs. 1 to 7, the contacts 72 and 58 combine, in about the manner as already described in connection with the contacts 54 and 58, to provide fixed contacts of a switch 73 which includes a pivoted contact 74 fixed upon the shaft 33 and attached to the armature 34, as at 75, to move with said armature and wipe over said contacts 72 and 58. The pivoted contact 74 is insulated from the shaft 33 and the armature 34 in any convenient way. A pin 76 in the shaft 33 enters insulation 77 about said shaft, and a pin 78 fixes said pivoted contact 74 to said insulation. At 79 is an insulating bushing having tight fit in a cavity 80 of the armature 34, numeral 81 representing a screw passing through the pivoted contact 74 and entering said insulating bushing. See Fig. 7. The third contact 72 is suitably supported upon the housing, or the engine, in any convenient manner to be insulated from the contact 58 and from said housing, or engine. Said contact 72 is a rectangular bar having an extension or spring arm 82 arranged parallel to the contact 58, opposite the contact 54, and providing the desired resiliency for the fixed contact members of the switch 73 when wiped by the pivoted contact 74.

The arrangement is such that when the coil springs 26 and 37, or one of said springs when a single spring is employed, are holding the manipulating bar 24 and the lever 29 in their rearward positions to situate the fuel supply control valve in open position and the throttle valve adjusting devices in inoperative position, the armature 34 is so located that the pivoted contact 74, fixed to said armature to move therewith, is arranged between the fixed contacts 72 and 58 to make the ignition circuit, but the instant the magnet is energized sufficiently and the armature is actuated against the action of said coil springs (or coil spring), the pivoted contact 74 is withdrawn from the fixed contacts 72 and 58 to break the ignition circuit. It will be apparent that the ignition circuit will be made at all times when explosive mixture is being fed to the cylinders, and will be broken at all times when air free of explosive mixture is entering said cylinders.

It may be found desirable at times when the throttle actuating rod is retarded and the engine is being propelled by a vehicle, or is racing, to open the fuel supply line and render the throttle valve adjusting devices inoperative, as, for example, when it is desired to utilize the vacuum or suction in an intake manifold to do work, such as actuate a booster brake, or operate a wind shield cleaner. This can be done by closing a switch, which would be the equivalent of the switch 59, to shunt the circuit away from the magnet. The switch could be closed automatically, as when a booster brake was to be actuated, or could be closed manually, as when a wind shield cleaner actuated by vacuum or suction in the intake manifold was to be set into action.

It will be evident that the air admitted through the air inlet 15 of the carburetor, with fuel line closed and throttle valve open, can be transmitted to the cylinders at approximately atmospheric pressure.

It will also be evident that the keeping of gasoline out of the cylinders when a vehicle is propelling an engine or the engine is racing and there is no need for utilizing gasoline to accomplish propulsion, saves gasoline, and, in addition to this, the furnishing of air approximately at atmospheric pressure to the cylinders under the light load working conditions which exist therein when the engine is propelled by a vehicle or is racing, provides pressure in the cylinders preventing the drawing of lubricating oil into the combustion chambers.

While we have preferred to disclose the magnet 35 as the special device to actuate the fuel control valve and the throttle valve, it is to be understood that other devices could be substituted.

What we claim is:

1. In an internal combustion engine, a carburetor including a fuel supply line and an air inlet, a cylinder, an intake manifold between said carburetor and cylinder, a fuel control valve in said fuel supply line, a throttle valve in said intake manifold between said carburetor and cylinder, means for holding said fuel control valve to open said fuel supply line, throttle actuating means for manipulating said throttle valve when said fuel supply line is open to cause a feed of explosive mixture to said cylinder, and means for moving said fuel control valve to close said fuel supply line and for simultaneously moving said throttle valve to open position.

2. In an internal combustion engine, a carburetor including a fuel supply line and an air inlet, a cylinder, an intake manifold between said carburetor and cylinder, a fuel control valve in said fuel supply line, a throttle valve in said intake manifold between said carburetor and said cylinder, means for holding said fuel control valve to open said fuel supply line, throttle actuating means for manipulating said throttle valve when said fuel supply line is open to cause a feed of explosive mixture to said cylinder, mechanism responsive to the speed of the engine for moving said fuel control valve to close said fuel supply line and for simultaneously moving said throttle valve to open position.

3. In an internal combustion engine, a carburetor including a fuel supply line and an air inlet, a cylinder, an intake manifold between said carburetor and cylinder, a fuel control valve in said fuel supply line, a throttle valve in said intake manifold between said carburetor and said cylinder, means for holding said fuel control valve to open said fuel supply line, throttle actuating means for manipulating said throttle valve when said fuel supply line is open to cause a feed of explosive mixture to said cylinder, mechanism responsive to the speed of the engine operative while the throttle actuating means is in the idling position to move said fuel control valve to close said fuel supply line and to simultaneously move said throttle valve to open position to admit air at practically atmospheric pressure to said cylinder, and means operated by said throttle actuating means to interrupt the operation of said mechanism when said throttle valve is open wider than the idling position.

4. In an internal combustion engine, a carburetor including a fuel supply line and an air inlet, a cylinder, an intake manifold between said carburetor and cylinder, a fuel control valve in said fuel supply line, a throttle valve in said intake manifold between said carburetor and said cylinder, means for holding said fuel control valve to open said fuel supply line, throttle actuating means for manipulating said throttle valve when said fuel supply line is open to cause a feed of explosive mixture to said cylinder, mechanism responsive to the speed of the engine while the throttle actuating means in the idling position and the engine is being operated by a force other than that of the explosion of mixture in said cylinder adapted to move said fuel control valve to close said fuel supply line and to simultaneously move said throttle valve to open position and means operated by said throttle actuating means to interrupt the operation of said mechanism when said throttle valve is open wider than the idling position.

5. In an internal combustion engine, a carburetor including a fuel supply line and an air inlet, a cylinder, an intake manifold between said carburetor and cylinder, a fuel control valve in said fuel supply line, a throttle valve in said intake manifold between said carburetor and said cylinder, throttle valve actuating means, an equalizing bar pivoted upon said throttle valve actuating means, said throttle valve being pivotally associated with said equalizing bar, a manipulating member associated with said fuel control valve and said equalizing bar, resilient means normally holding said manipulating member to locate said fuel control valve in the open position of said fuel supply line and said equalizing bar to allow said throttle valve to be subject to manipulations of said throttle actuating means, and means for actuating said manipulating member against the action of said resilient means to move said fuel control valve to close said fuel supply line and to simultaneously move said throttle valve to the open position of said intake manifold.

6. In an internal combustion engine, a carburetor including a fuel supply line and an air inlet, a cylinder, an intake manifold between said carburetor and cylinder, a fuel control valve in said fuel supply line, a throttle valve in said intake manifold between said carburetor and said cylinder, throttle valve actuating means, an equalizing bar pivoted upon said throttle valve actuating means, said throttle valve being pivotally associated with said equalizing bar, a manipulating member associated with said fuel control valve and said equalizing bar, resilient means normally holding said manipulating member to locate said fuel control valve in the open position of the fuel supply line and said equalizing bar to allow said throttle valve to be subject to manipulations of said throttle actuating means, mechanism responsive to the speed of the engine for actuating said manipulating member against the action of said resilient means to move said fuel control valve to close said fuel supply line and to simultaneously move said throttle valve to the open position of said intake manifold, and means operated by the throttle valve operating means to interrupt the operation of said mechanism when the throttle valve is open wider than the idling position.

7. In an internal combustion engine, a carburetor including a fuel supply line and an air inlet, a cylinder, an intake manifold between said carburetor and cylinder, a fuel control valve in said fuel supply line, a throttle valve in said intake manifold between said carburetor and said cylinder, throttle valve actuating means, an equalizing bar pivoted upon said throttle valve actuating means and pivotally associated with said throttle valve, a manipulating member associated with said fuel control valve and pivoted to the end portion of said equalizing bar opposite said throttle actuating means, resilient means normally holding said manipulating member to locate said fuel control valve in the open position of said fuel supply line and said equalizing bar to allow said throttle valve to be subject to manipulations of said throttle actuating means, and means operative only when said throttle actuating means is in the idling position of said engine and the engine is being operated by a force other than explosion of mixture in said cylinder for actuating said manipulating member against the action of said resilient means to move said fuel control valve to close said fuel supply line and to simultaneously move said throttle valve to the open position of said intake manifold.

8. In an internal combustion engine, a carburetor including a fuel supply line and an air inlet, a cylinder, an intake manifold between said carburetor and cylinder, a fuel control valve in said fuel supply line, a throttle valve in said intake manifold between said carburetor and said cylinder, throttle valve actuating means, an equalizing bar pivoted upon said throttle valve actuating means and pivotally associated with said throttle valve, a manipulating member associated with said fuel control valve and pivoted to the end portion of said equalizing bar opposite said throttle actuating means, resilient means normally holding said manipulating member to locate said fuel control valve in the open position of said fuel supply line and said equalizing bar to allow said throttle valve to be subject to manipulations of said throttle actuating means, and means operative only when said throttle actuating means is in the idling position of said engine and the engine is being operated by a force other than explosive mixture in said cylinder for actuating said manipulating member against the action of said resilient means to move said fuel control valve to close said fuel supply line and to simultaneously move said throttle valve to the open position of said intake manifold, said last mentioned means being adapted to allow said resilient means to act to cause said manipulating member to return said fuel control valve to the open position of said fuel supply line and allow said throttle valve to be again subject to actuations of said throttle actuating means either when said force other than explosive mixture ceases to operate said engine or when said throttle actuating means is advanced.

9. The combination as specified in claim 7, wherein the resilient means normally holding said manipulating member to locate said fuel control valve in the open position of said fuel supply line and said equalizing bar to allow said throttle valve to be subject to manipulations of said throttle actuating means is a spring, and wherein said means operative only when said throttle actuating means is in the idling position of said engine and the engine is being operated by a force other than explosive mixture in said cylinder for actuating said manipulating member to move said fuel control valve to close said fuel supply line and to simultaneously move said throttle valve to open position of said intake manifold is a magnet with pivoted armature associated with said manipulating bar.

10. The combination as specified in claim 7, an ignition circuit, means for closing said ignition circuit when said fuel control valve is in the open position of said fuel supply line, and means for breaking said ignition circuit when said fuel control valve is in the closed position of said fuel supply line.

11. In an internal combustion engine, a carburetor including a fuel supply line and an air inlet, a cylinder, an intake manifold between said carburetor and cylinder, a fuel control valve in said fuel supply line, a throttle valve in said intake manifold between said carburetor and said cylinder, throttle valve actuating means, an equalizing bar pivoted upon said throttle valve actuating means and pivotally associated with said throttle valve, a manipulating member associated with said fuel control valve and pivoted to the end portion of said equalizing bar opposite said throttle actuating means, resilient means normally holding said manipulating member to locate said fuel control valve in the open position of said fuel supply line and said equalizing bar to allow said throttle valve to be subject to manipulations of said throttle actuating means, and means operative only when said throttle actuating means is in the idling position of said engine and the engine is being operated by a force other than explosive mixture in said cylinder for actuating said manipulating member against the action of said resilient means to move said fuel control valve to close said fuel supply line and to simultaneously move said throttle valve to the open position of said intake manifold, said last mentioned means including a pivoted armature, a magnet having said armature, a circuit in which said magnet is arranged, and a lever fixed to move with said armature and associated with said manipulating member.

12. In an internal combustion engine, a carburetor including a fuel supply line and an air inlet, a cylinder, an intake manifold between said carburetor and cylinder, a fuel control valve in said fuel supply line, a throttle valve in said intake manifold between said carburetor and cylinder, throttle valve actuating means, an equalizing bar pivoted upon said throttle valve actuating means and pivotally associated with said throttle valve, a manipulating member associated with said fuel control valve and pivoted to the end portion of said equalizing bar opposite said throttle actuating means, resilient means normally holding said manipulating member to locate said fuel control valve in the open position of said fuel supply line and said equalizing bar to allow said throttle valve to be subject to manipulations of said throttle actuating means, means operative only when said throttle actuating means is in the idling position of said engine and the engine is being operated by a force other than explosive mixture in said cylinder for actuating said manipulating member against the action of said resilient means to move said fuel control valve to close said fuel supply line and to simultaneously move said throttle valve to open said intake manifold to the atmosphere, said last mentioned means including a pivoted armature, a magnet having said armature, a circuit in which said magnet is arranged, and a lever fixed to move with said armature and associated with said manipulating member, fixed members of a switch in said circuit, and a switch member movable with said throttle valve actuating means and adapted to engage said fixed members of said circuit to shunt said circuit from said magnet when said throttle valve actuating means is moved from its idling toward its advanced position.

13. The combination as specified in claim 12, an ignition circuit having fixed switch members, and a switch member movable with said armature and adapted to engage said fixed members of said ignition circuit to make said ignition circuit when said fuel control valve is in the open position of said fuel supply line and said equalizing bar is in position to allow said throttle valve to be subject to manipulations of said throttle valve actuating means, and to break said circuit when said fuel control valve closes and said throttle valve opens.

14. In an internal combustion engine, a throttle valve, throttle valve actuating means, resilient means normally holding said throttle valve actuating means in position to close said throttle valve, an equalizing bar pivoted upon said throttle valve actuating means, a manipulating member to which said equalizing bar is pivoted, means intermediate said throttle actuating means and said manipulating member pivotally connecting said throttle valve to said equalizing bar, resilient means normally holding said manipulating member at one limit of its movement, and means for automatically advancing said manipulating member toward its other limit when said throttle actuating means is at its throttle valve closing position and the engine is being operated by a force other than the ordinary explosions in its cylinders.

15. In an internal combustion engine, a throttle valve, throttle valve actuating means, resilient means normally holding said throttle valve actuating means in position to close said throttle valve, an equalizing bar pivoted upon said throttle valve actuating means, a movable manipulating member to which said equalizing bar is pivoted, means intermediate said throttle actuating means and said manipulating member pivotally connecting said throttle valve to said equalizing bar, resilient means for holding said manipulating member in its normal position at one limit of its movement, and means for automatically advancing said manipulating member when said throttle actuating means is at its throttle valve closing position and the engine is being operated by a force other than the ordinary explosions in its cylinders, said throttle valve being adapted to be manipulated by said throttle valve actuating means when said manipulating member is in its normal position, and said throttle valve being adapted to move to wide open position when said manipulating member is automatically advanced.

16. In an internal combustion engine, throttle actuating means, resilient means normally holding said throttle actuating means in retarded position, a valve manipulating member, resilient means normally holding said manipulating member in retarded position, means for advancing said manipulating member at times when said throttle actuating means is in retarded position, said last mentioned means including an electric circuit having a magnet with pivoted armature operatively connected with said manipulating means, spaced apart fixed contact members in said circuit, said contact members being insulated from each other, and a movable contact member adapted to bridge said fixed contact members when said throttle actuating means is advanced from idling toward advanced position to shunt the circuit from said magnet.

17. In an internal combustion engine, throttle actuating means, resilient means normally holding said throttle actuating means in idling position, a valve manipulating member, resilient means normally holding said manipulating member in the normal working position of said engine, means for moving said manipulating member to make said engine inoperative at times when said throttle actuating means is in idling position, said last mentioned means including an electric circuit, a magnet in said circuit, a pivoted armature for said magnet, and a connection between said armature and said manipulating member, and means for shunting said circuit from said magnet when said throttle actuating means is moved from idling toward advanced position, said circuit shunting means including spaced apart fixed contact members in said circuit, and a movable contact member associated with said throttle actuating means and adapted to bridge said fixed contact members.

18. The combination as specified in claim 17, an ignition circuit including a fixed contact member spaced from one of said fixed contact members of said magnet circuit, and a contact member movable with said armature adapted to bridge the fixed contact members of said ignition circuit when said manipulating member is in the normal operating position of said engine.

19. In an internal combustion engine, throttle actuating means, a valve manipulating member, an electric circuit including a magnet having an armature, a shaft upon which said armature is fixed, a lever fixed upon said shaft and associated with said manipulating member, a second shaft about the shaft first mentioned, a lever fixed to said second shaft and associated with said throttle actuating means, spaced apart, fixed contact members in said electric circuit, and a contact member fixed upon said shaft having said lever associated with said throttle actuating means and adapted to bridge said spaced apart, fixed contact members of said electric circuit.

20. In an internal combustion engine, throttle actuating means, a valve manipulating member, an electric circuit including a magnet having an armature, a shaft upon which said armature is fixed, a lever fixed upon said shaft and associated with said manipulating member, a second shaft about the shaft first mentioned, a lever fixed to said second shaft and associated with said throttle actuating means, spaced apart, fixed contact members in said electric circuit, an ignition circuit, one of the fixed contact members of said magnet circuit being in said ignition circuit, a second fixed contact member in said ignition circuit and spaced from said one fixed contact member of said magnet circuit, a contact member fixed upon said shaft having said lever associated with said throttle actuating means and adapted to bridge said spaced apart, fixed contact members of said electric circuit having said magnet, and a contact member fixed to move with said armature and adapted to bridge said spaced apart, fixed contact members of said ignition circuit.

21. In an internal combustion engine, the combination of a fuel and air mixing device, a cylinder, a conduit between the mixing device and cylinder, automatic means for cutting off the supply of fuel to the cylinder when the speed of the engine exceeds the normal idling speeds, and means for disabling said fuel cut-off means when the engine speed is above the idling speeds, said automatic cut-off means including an electric circuit, a rotatably mounted armature, an electromagnet having a field when energized for causing rotation of said armature, a valve moved by the rotation of said armature to open position, when the electromagnet is energized, a short-circuiting switch for de-energizing said electromagnet in said circuit, and means for closing said circuit.

22. In an internal combustion engine, the combination of a cylinder, a carburetor for supplying fuel to said cylinder, a conduit intermediate the carburetor and cylinder, a valve for varying the amount of fuel supplied from said carburetor, control means for moving the valve to position to cut off the supply of fuel to the cylinder, said control means being operative only when the speed of the engine is above idling speeds and the engine is being driven by forces other than those derived from fuel in the cylinder, an ignition circuit, and means for disabling said valve control means and closing said ignition circuit.

23. In an internal combustion engine, the combination of a cylinder, means for supplying fuel to said cylinder, a valve for controlling the supply of fuel to the cylinder, control means for moving the valve to a position to cut off the supply of fuel to the cylinder, said control means being operative only when the speed of the engine is above idling speed and the engine is being driven by forces other than those derived from the explosion of fuel in the cylinder.

24. In combination with an internal combustion engine, electrically operated means for cutting off the flow of fuel to a cylinder of the engine when the throttle actuating means is moved to throttle closing position, and means for automatically rendering such means inactive when the engine reaches idling speed.

25. In combination with an internal combustion engine and a liquid fuel line to said engine, means working in said liquid fuel line and for bringing about a discontinuance of the flow of liquid fuel through said line when the accelerator is moved to closing position, and means for rendering such means ineffective when the engine reaches idling speed.

26. In combination with an internal combustion engine and a liquid fuel line to said engine, means working in said liquid fuel line and operative when the accelerator is moved to closing position to bring about a reduction in the quantity of liquid fuel fed through said line to a point where the liquid fuel fed is insufficient for the needs of the engine when idling, and means for rendering such means ineffective when the engine reaches idling speed.

27. In combination with an internal combustion engine including a member controlling the fuel supply to the engine and shiftable between a retarded position where the engine is fed an idling charge and advanced positions, means working in said liquid fuel line for cutting off the flow of fuel to a cylinder of the engine when said member is permitted to return to retarded position, and means for rendering such means ineffective when the engine reaches idling speed.

LESTER H. MESSINGER, JR.
A. LAWRENCE RIKER,
*Assignee of Andrew L. Riker, Deceased.*